Figure 1:
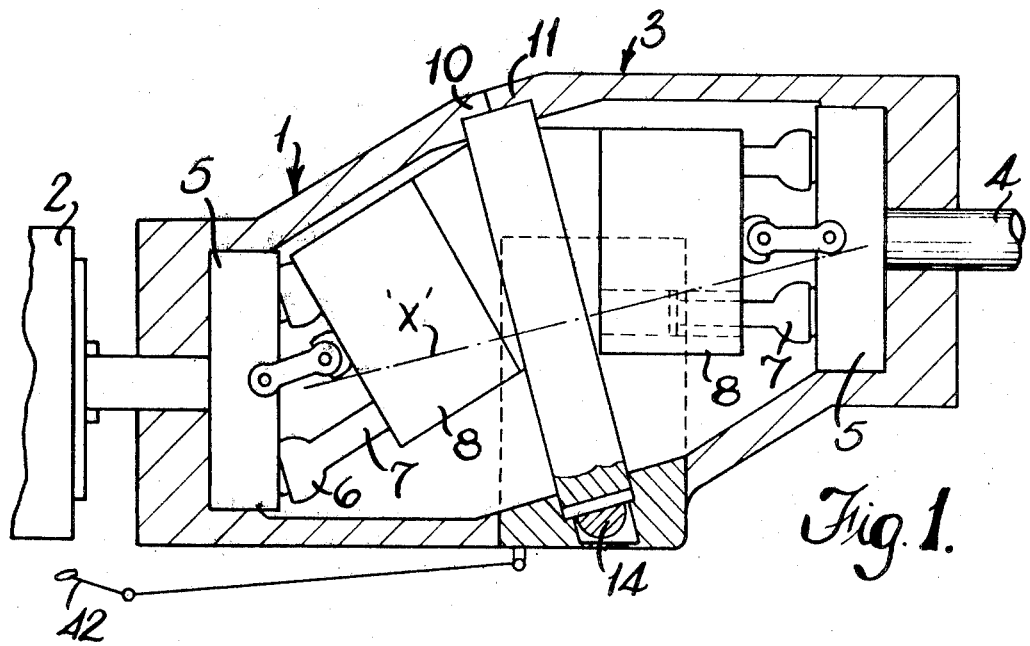

United States Patent [11] 3,601,981

[72] Inventor Richard Joseph Ifield
 Beecroft, New South Wales, Australia
[21] Appl. No. 873,411
[22] Filed Nov. 3, 1969
[45] Patented Aug. 31, 1971
[73] Assignee Joseph Lucas (Industries) Limited
 Birmingham, England

[54] CONTROL SYSTEMS FOR HYDRAULIC TRANSMISSION SYSTEMS
 11 Claims, 4 Drawing Figs.

[52] U.S. Cl. .................................................. 60/19,
 60/52 US, 60/53 A
[51] Int. Cl. ................................................ F16d 31/02
[50] Field of Search ......................................... 60/53 A, 52
 US, 19

[56] References Cited
 UNITED STATES PATENTS
| | | | |
|---|---|---|---|
| 3,132,486 | 5/1964 | Jonkers et al. | 60/53 A |
| 3,167,907 | 2/1965 | Kempson | 60/19 |
| 3,204,411 | 9/1965 | Stockton | 60/53 A |
| 3,284,999 | 11/1966 | Lease | 60/19 |

*Primary Examiner*—Edgar W. Geoghegan
*Attorney*—Holman & Stern

ABSTRACT: An hydraulic control system for hydraulic automatic transmission systems of the kind including a pump and motor of piston type and a common ported member having a pair of ports through which air flows between the pump and the motor, the control system being arranged to move the common ported member angularly by means of a piston and cylinder type servo device, admission of fluid to the servo device being controlled from an auxiliary engine driven positive displacement type pump by a valve in the passage means leading to the servo cylinder, the passage means being controlled in accordance with whichever of the two pressures in the two ports of the ported member is lower through a relief valve, the arrangement being such that the pressure from the auxiliary pump is applied to said valve in the passage means to allow entry of fluid at the pressure of the lower of the two ports to enter the cylinder of the servo device to control the angular position of the ported member, and thus to control the strokes of the pump and motor.

PATENTED AUG 31 1971  3,601,981

SHEET 1 OF 3

INVENTOR
Richard Joseph Ifield
BY Holman, Glascock,
Downing & Seebeck
ATTORNEYS

CONTROL SYSTEMS FOR HYDRAULIC TRANSMISSION SYSTEMS

This invention relates to hydraulic control systems for hydraulic automatic transmission systems of the kind comprising an hydraulic piston type pump arranged to be driven by a prime mover, and an hydraulic piston type motor arranged to receive hydraulic fluid from the pump, a common ported member having a pair of ports, through which, in use, fluid flows between the pump and the motor, the member being movable to vary the strokes of the pistons of the pump and motor respectively in order to vary the speed ratio between an input shaft of the pump and a motor output shaft, the control system being arranged to move said ported member in accordance with changes in speed of the prime mover and with changes in the pressure of the fluid in whichever of the ports of the ported member is at a higher pressure. Such a transmission system, will, for convenience, be referred to as being of the kind specified.

The object of this invention is to provide an hydraulic control system for a transmission system of the kind specified in a convenient form.

According to the present invention, an hydraulic control system for a transmission system of the kind specified comprises a positive displacement type auxiliary pump arranged to be driven by a prime mover whereby the transmission system is driven, passage means affording communication between the downstream side of said auxiliary pump and the interior of said ported member, valve means affording communication between said passage means and whichever of the two ports in the member is at a lower pressure, a relief valve whereby fluid from said lower pressure port can escape, further passage means in the ported member whereby fluid from the higher pressure port can reach the relief valve to tend to oppose the opening thereof under the influence of the pressure of fluid from the lower pressure port, the area of the relief valve on which the higher pressure acts being substantially smaller than that on which the lower pressure acts, the relief valve being arranged to regulate the pressure in the lower pressure port in accordance with the pressure existing in the higher pressure port, a piston and cylinder type servo device arranged to move the ported member to vary the piston strokes of the pump and motor respectively, and further valve means whereby, when the pressure at the delivery side of said auxiliary pump reaches a predetermined value, fluid at the pressure existing in said lower pressure port is permitted to enter one end of the cylinder of the servo device whilst fluid from the other end is permitted to escape.

Figure 2:
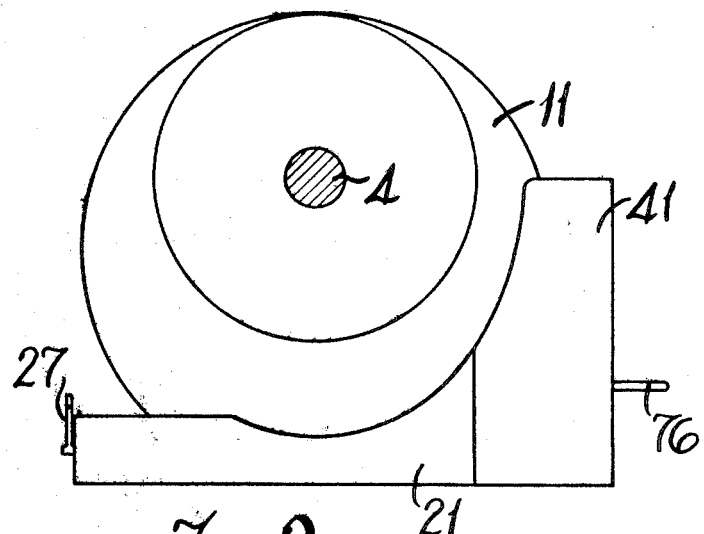
Figure 3:
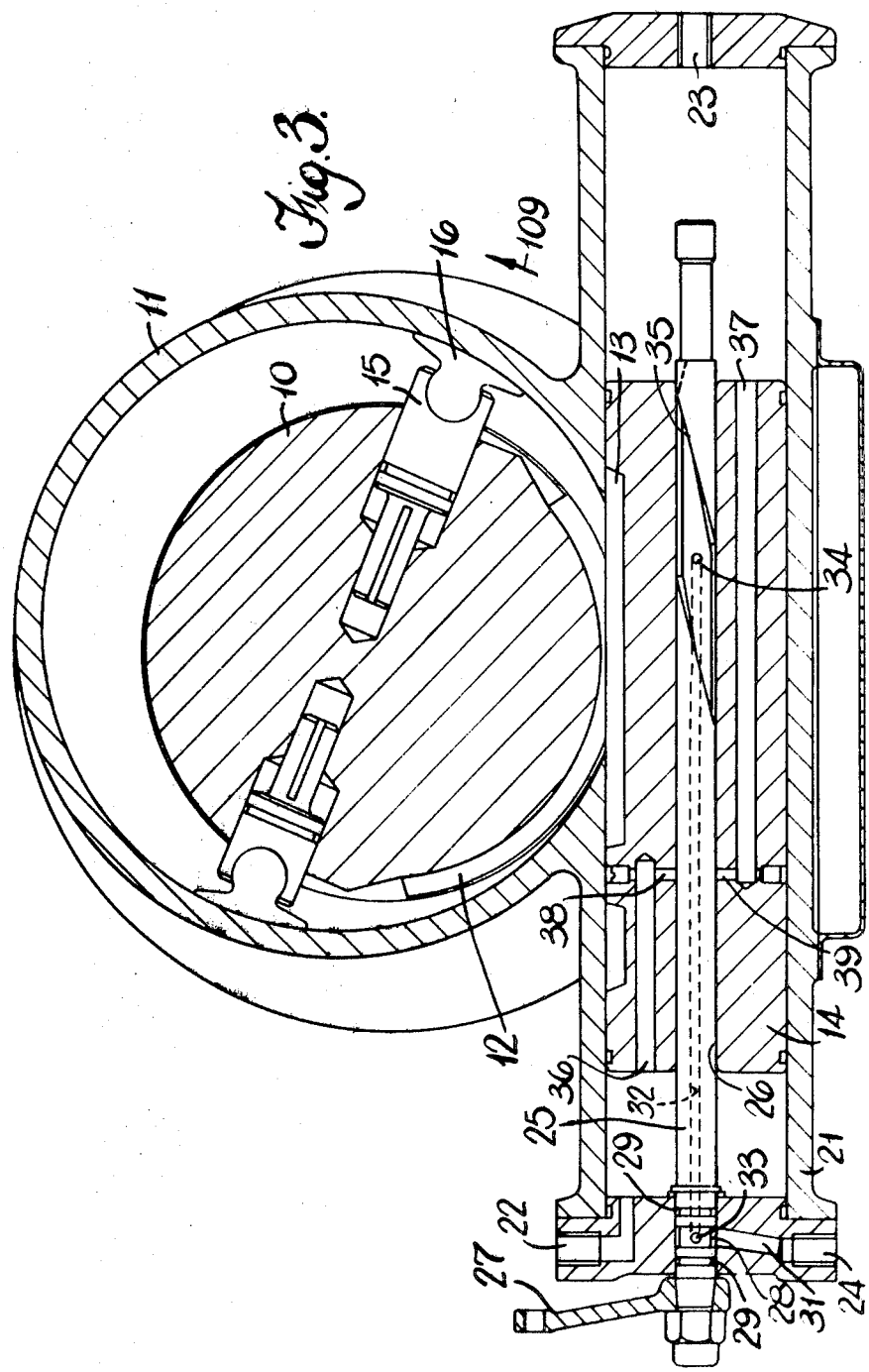
Figure 4:
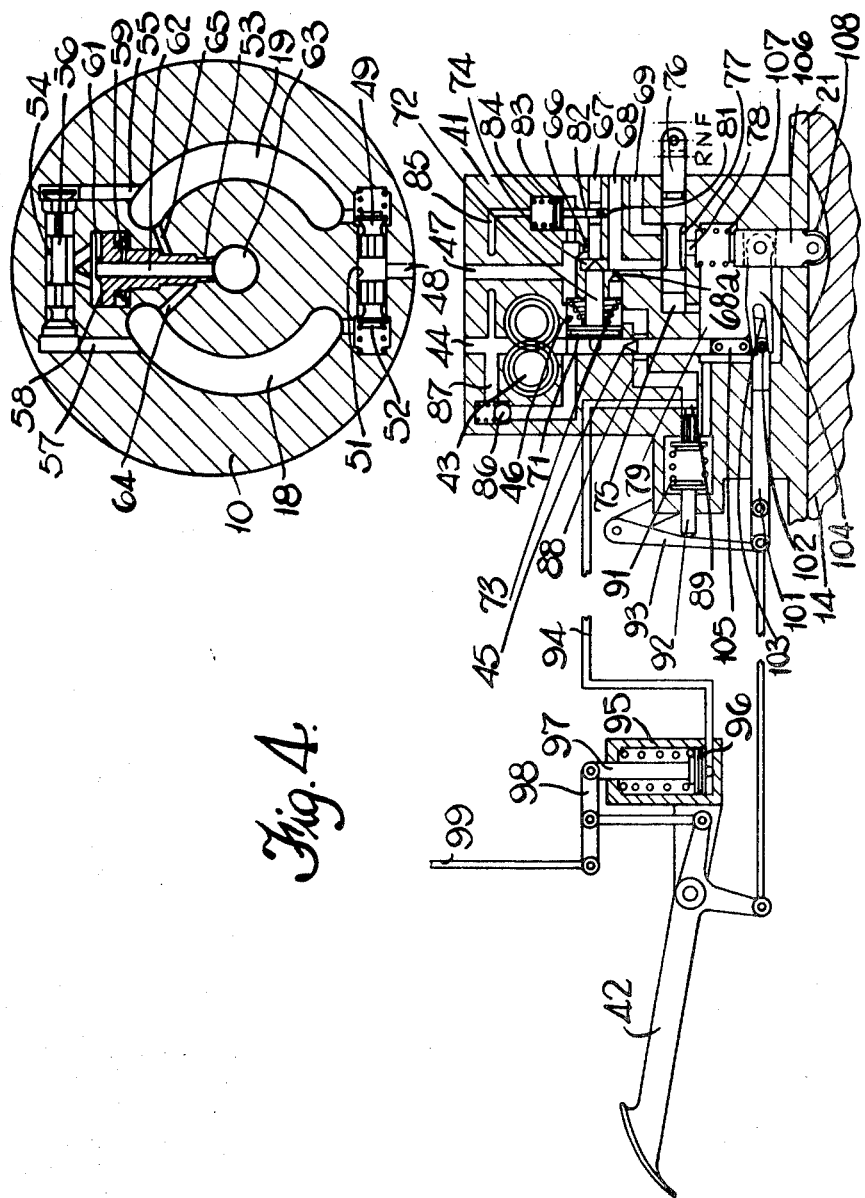

The invention will be described by way of example with reference to the accompanying drawings in which:

FIG. 1 shows a pump and motor unit forming a transmission system in accordance with this invention, FIG. 2 shows the unit in FIG. 1 in end elevation, FIG. 3 is an enlarged cross-sectional view of a control system with servo device for use in the transmission system, and FIG. 4 is a diagrammatic view of a part of the control system for the transmission system.

In the example illustrated, the transmission system is of the kind described and claimed in the Complete Specification of our copending British Patent Application No. 4412/68. This transmission system comprises an hydraulic pump 1 arranged to be driven by a prime mover 2, and an hydraulic motor 3 which receives motive fluid from the pump 1 and which is arranged to drive an output shaft 4. The pump and the motor are substantially the same and are of the kind comprising a rotatable member 5 carrying, through a plurality of universal joints 6, a plurality of angularly spaced pistons 7 engaging in a rotor 8. The rotor has bores for reception of the pistons respectively, and the end of the rotor remote from the rotatable member engages a ported member 10 whereby fluid can enter and leave the bores containing the pistons 8. The pump 1 and motor 3 are mounted in a common split casing 11.

The ported member 10 is common to the pump and motor and has respective surfaces against which the rotors of the pump and motor engage. The arrangement is such that angular movement of the ported member 10 about an axis 'X' which is fixed relatively to the casing, causes change in the inclination of the rotors with respect to the axes of the input and output shafts of the transmission system, so as to vary the strokes of the pistons of the pump and motor respectively, thus varying the speed ratio between the input and output shafts in use.

The control system which is the subject of this application is arranged to impart angular movement to the ported member 10, and in order to accomplish this, the ported member 10, as shown in FIG. 3, is provided with a gear quadrant 12 engageable with a rack 13 formed on the piston 14 of a piston and cylinder-type servo device.

The positions of the surfaces of the member 10 against which the pump and motor rotors 8 engage are so disposed that there is a tendency for the member 10 to move to increase the stroke of the pump pistons. However, in order to counteract this tendency, the ported member 10 carries a pair of pistons 15 having respective slippers 16, which engage the internal surface of the casing 11, which in this region region is eccentric with respect to the axis about which the ported member 10 is mounted. The pistons 15 are stepped, and are disposed in respective stepped bores 17 in the ported member 10, these bores being supplied with fluid under pressure from any convenient source such as the ports in the member, so as to react upon the casing 11. The axes of the pistons 15 are offset from the axis of the ported member 10 as illustrated.

FIG. 4 shows the ports 18, 19 and it will be assumed throughout this description, that the port 18 is, during use, subjected to a higher pressure than that existing in the port 19. The higher pressure port 18 is, when forward travel of the transmission system is selected, connected between the outlet of the pump and the inlet of the motor, but it is to be understood that under overrun conditions, the port 19 will be at a higher pressure than the port 18.

In order to produce angular movement of the ported member 10, the piston 14 of the piston and cylinder type servo device is moved in its cylinder 21, which as shown in FIG. 3, is connected to the casing 11 of the transmission system.

The servo device is a double acting mechanism, and there are entry ports 22, 23 communicating with opposite ends of the cylinder respectively. At one end at which the port 22 is disposed, there is an outlet port 24, through which fluid from either end of the cylinder can escape to a relatively low pressure region of the system, such as a sump. Flow through the port 24 is however, controlled by a rod 25 which is journaled in the end of the cylinder 21, at which the ports 22 and 24 are disposed, and passes through a bore 26 extending through the center of the piston 14.

The rod 25 has outside the cylinder 21, an arm 27 connected to it, this arm being connected in turn to a control which is manually operated. The end of the rod 25 which is journaled in the end of the cylinder 21, has an annular groove 28 flanked by a pair of sealing grooves 29, the groove 28 being in communication through a passage 31 with the port 24. The rod which is cylindrical has a concentric drilling 32, which affords communication through the center of the rod, between a hole 33 opening into the groove 28, and a second hole 34 opening into a wide helical groove 35, extending to a shoulder near the other end of the rod 25.

The piston 14 has a pair of drillings 36, 37 communicating with the central bore 26 thereof, through diametrically opposite cross drilling 38 and 39.

The helical groove 35 is in the form of a complete single helix of substantial peripheral width, extending to the shoulder on the rod, and movement of the piston 14 with respect to the rod 25 affords communication between the cross drillings 38, 39 and the helical groove 35. When the groove 35 communicates either with the drilling 38 or with the drilling 39, fluid is permitted to escape from the appropriate end of the cylinder 21 through the appropriate drilling 36 or 37, and the hold 34, the drilling 32, the hole 33, the groove 28, the passage 31 and the part 24. When both drillings 38, 39 communicate with the groove 35, the pressures at opposite ends of the piston 14 equalize causing movement of the piston to cease.

If it is desired to hold the transmission in some intermediate ratio when forward travel is selected, the lever 27 is moved through an angle between 90° and 180° from the position shown in FIGS. 3 and 4, thus also moving the rod 25. When the piston moves, upon application of pressure through the entry port 22, to a position in which the groove 35 communicates with the drilling 38, this will effectively be connected to exhaust, through the drilling 32 and the port 24, thus arresting further movement. The angular position of the rod 25 determines the position of the piston at which the movement is arrested. This also therefore determines the position of the ported member 10 and thus the maximum speed ratio which can be achieved.

In order to control the supply of fluid to the ends of the cylinder 21 respectively, the unit 41 is provided. This unit 41 is connected to the cylinder 21 of the servo device, a portion of the piston 14 of that device being illustrated in FIG. 4.

It is intended that the fluid reaching the ends of the cylinder 21 for controlling the speed ratio of the transmission system shall be at a pressure which is dependent not only upon the pressure in the high pressure port 18, of the ported member 10, but shall also be dependent upon the speed of the prime mover. The position of the throttle associated with the prime mover also determines the pressure of the fluid supplied to the servo device, as will be described. The throttle control of the prime mover is indicated in FIG. 4 at 42.

In order to obtain the required pressure for supply to the ports 22 and 23 of the servo device, the unit 41 includes a positive displacement type pump 43, which in this example is a gear pump, which draws fluid through a duct 44 from a suitable reservoir or or sump. At the downstream side of the pump 43, the fluid flows past a valve 45 which is controlled in a manner to be described in accordance with the position of the throttle control 42. The fluid flows through a chamber 46 to a passage 47, which opens into the space defined between the casing 11 and the ported member 10. The ported member 10 has in its periphery an entry passage 48 for fluid from such space between the casing 11 and the ported member 10, this passage 48 communicating with the low pressure port 19 of the ported member 10. The passage 48 communicates with the low pressure port 19 through a spring-loaded shuttle valve 49, disposed in a cylinder 51 which also contains another spring-loaded valve 52, whereby fluid from the passage 48 could reach the other port 18 if this were at a lower pressure than the port 19.

The ported member 10 contains between the port 18 and the port 19, a stepped radial bore 53, the wider end of which communicates with a cylinder 54, which is, in turn, in communication with the low pressure port 19 through a drilling 55. The cylinder 54 contains a double-ended shuttle valve 56, and the other end of the cylinder from the drilling 55 communicates with the high pressure port 18, through a further drilling 57. The double-ended valve 56, however, ensures that only the low pressure port 19 can communicate with the wider end of the stepped bore 53 as illustrated, but should the pressure in the port 19 exceed that in the port 18, the valve 56 will change over, so as always to ensure that the lower pressure of fluid is applied to the wider end of the stepped bore 53.

The stepped bore 53 contains a relief valve member 58, which is stepped to engage in the respective stepped portions of the stepped bore 53. There is a spring 59 urging an axially presented annulus 61 formed at the wider end of the relief valve member 58 into engagement with a corresponding seating formed at the end of the bore 53. Under the action of the spring 59, the relief valve member 58 can move into engagement with the seating at the end of the stepped bore 53, to prevent access of fluid to a concentric drilling 62 passing through the center of the member 58.

The stepped bore 53 and the drilling 62 open into a central cavity 63 within the ported member 10 which is open to a low pressure region of the system. From this low pressure region a lubrication flow for the transmission system is obtained.

One of the steps of the bore 53 near the smaller end thereof, communicates with high pressure port 18 through a drilling 64, and a further adjacent step of the bore 53 communicates with the port 19 through a further drilling 65.

In use, fluid from the pump 43 flows past the valve 45, and into the passage 47 from which it is discharged into the space between the ported member 10 and the casing 11. The fluid in this space enters the passage 48, and flows from this into the low pressure port 19. The fluid pressure in this port is exerted upon the wider end of the relief valve member 58, and tends to move this so that its seating 61 moves away from the end of the stepped bore 53 against the action of the spring 59. Once movement has taken place, fluid from the low pressure port 19 can escape through the drilling 62 to the central cavity 63 of the member 10 from which it is drained to a low pressure region of the system.

The opening of the relief valve comprised by the member 58 is, however, opposed not only by the spring 59, but also by the action of fluid at the high pressure in the port 18 acting through the drilling 64 upon the appropriate step of the member 58. Thus, the pressure which is maintained in the port 19 is dependent upon the pressure in the higher pressure port 18. The action of the fluid in the low pressure port through the drilling 65 upon the member 58 is insignificant, since the areas over which the high and low pressures act upon the member 58 differ substantially as shown.

The pressure in the low pressure port is therefore the pressure in the space between the ported member 10 and the casing 11, and is thus also the pressure in the passage 47. The passage 47 has a restricted branch 66 whereby fluid can reach a duct 67 which communicates with the port 23 at one end of the cylinder 21 of the servo device. The chamber 46 through which the fluid flows from the pump 43 to the passage 47, also has a restricted further outlet 68a, through which fluid can enter a further duct 68, which, in turn, communicates with the port 22 in the other end of the cylinder 21 of the servo device.

The unit 41 has a still further passage 69 which communicates with the port 24 of the servo device.

The chamber 46 contains a piston 71 carrying a valve closure member 72, and backed by a spring 73, tending to move the piston towards a position in which the valve closure member 72 permits flow of fluid through the restricted passage 68a which communicates with the cylinder 46 through a short passage 74 connecting with the duct 67.

The piston 71 is so arranged that it is subjected to the pressures at the upstream and downstream sides respectively of the valve 45, and when the speed of the prime mover is sufficient to produce a predetermined pressure drop across the valve 45, the piston 71 will be moved to close access between the ducts 67 and 68 which also communicate with one another through the short passage 74.

The pressure drop at which the piston 71 moves, however, is also dependent upon the position of the valve 45, which is as previously stated, subject to the position of the throttle control 42.

The ducts 68, 69 communicate with a bore 75 containing a spool 76. The spool 76 extends out of the member 41, and is controllable manually to a linkage not illustrated. The spool 76 extends out of the member 41, and is controllable manually to a linkage not illustrated. The spool 76 has a groove 77 with which both ducts 68, 69 can communicate in the position of the spool 76 illustrated, and with which, at all times, communicates a passage 78 opening into a relatively low pressure region 79 of the unit 41.

Between the ducts 67 and 68, there is a passage 81 normally closed by a valve closure member 82, carried by a spring-loaded piston 83 which is subjected, at the side remote from its spring 84, to the pressure existing in the passage 47, and should this rise above a predetermined pressure, the piston 83 will move the member 82 out of the end of the passage 81, so as to permit communication between the ducts 67 and 68. The opposite end of the piston 83 communicates with the inlet 44 at the upstream side of the pump 43 through a passage 85 through the unit 41. The pump 43 also has a pressure relief valve 86 disposed in a passage 87, whereby fluid can bypass the pump 43 in the event of a rise in pressure at the downstream side thereof in excess of a predetermined value.

At the downstream side of the valve 45, there is a further passage 88 through which fluid can be applied to a spool 89 which is acted upon by a spring 91. The spring 91 acts against a movable abutment 92, the position of which is controlled by a lever 93 which, in turn, is controlled in accordance with the position of the throttle member 42. Movement of the spool 89 against the action of its spring 91, which in turn, is prestressed in accordance with the position of the throttle member 42, permits entry of fluid through the passage 88 and into a passage 94. The passage 94 communicates with one end of a cylinder 95 containing a piston 96 carrying a rod 97. The rod 97 carries the fulcrum arm 98 of a portion of the linkage 99 between the throttle control member 42 and the throttle proper of the prime mover for driving the transmission system. Thus, it will be seen that the pressure in the passage 88 which is the same as that in the pressure 47, and is thus dependent upon the pressure in the high pressure port 18, is used to control the position of the fulcrum of the throttle, thus limiting its opening in the event of a rise in the pressure in the passage 88 above a predetermined value.

The throttle control member 42 is connected through a rod 101 with a roller 102. This roller 102 acts in an inclined slot 103 in a member 104, which, in turn, is connected through a link 105 with the valve 45. The position of the member 104 and therefore the inclination of the slot 103 with respect to the direction of travel of the rod 101 is dependent upon the position of a member 106 connected to the member 104, this member 106 being backed by a spring 107, and carrying a roller 108 engaging in a shaped depression in the side of the piston 14 of the piston and cylinder-type servo device.

In use, if it is desired to decrease the speed ratio of the transmission system, in order to increase the speed of the associated vehicle or other apparatus without increasing the speed of the prime mover, it is arranged that the ported member 10 shall be rotated in an anticlockwise direction as indicated by the arrow 109 in FIG. 3. In order to achieve this it is necessary to permit fluid to enter the cylinder 21 through the port 22, and to permit escape of fluid from the opposite end. In order to achieve this, the spool 76 is moved to the right as shown, to the position marked F whereupon communication between the duct 68 and the groove 77 of the spool 76 will be cut off without cutting off communication between the duct 69 and this groove 77.

Since the duct 68 communicates with the port 22, and the duct 69 communicates with the port 24, it will be clear that conditions exist in which fluid can enter the end of the cylinder 21 to cause movement of the piston, so as in turn to rotate the ported member 10 in the direction of the arrow 109. Such movement can only take place, however, when the piston is disposed in a position to permit outlet through the drilling 37, and through the rod 25 to the port 24 and thence to the duct 69.

Flow of fluid into the duct 68 and not into the duct 67 will only take place, however, if there is sufficient pressure drop across the piston 71 to close communication between the ducts 67 and 68 by means of the valve closure member 72. Since escape from the end of the cylinder 21 through the drilling 37 can take place, there will be a higher pressure in the port 22 than exists in the port 23, and correspondingly, the pressure will be higher in the duct 68 than exists in the duct 67. The fluid can reach the duct 68 through the restricted passage 68a.

If it is required to increase the speed ratio, the piston 14 must be moved in the opposite direction, and in order to accomplish this, the rod 25 is rotated, so that communication is now afforded between the groove 35 in the rod 25 and the cross-drilling 38 and the drilling 36 in the piston 14.

If it is required to operate the transmission in reverse, the spool 76 is moved through the neutral position which is illustrated, to the left, and this has the effect of cutting off communication between the duct 69 and the low pressure region 79 of the unit 41. This does not affect communication between the duct 68 and the low pressure region.

If the throttle control member 42 is in the throttle closed position, there will be insufficient pressure drop across the valve 45, since the speed of the prime mover will be insufficient to produce this, to move the piston 71, but as soon as the operator opens the throttle to increase engine speed, the valve 45 will be moved, and there will be created a pressure drop sufficient to move the piston 71 to close communication between the ducts 67 and 68 through the short passage 74. The pressure in the duct 67 will now be higher than that in the duct 68, since the latter can communicate with the low pressure region 79 through the groove 77, and thus the piston 14 of the servo device will be moved in a direction to increase the ratio of the speeds of the input and output shafts of the transmission, by rotating the ported member 10 in a direction opposite to that indicated by the arrow 109.

The positive displacement type pump 43 operates as a pump whereby topping up of the ports 18, 19 takes place to replace any leakage which may occur therefrom during operation.

The pressure which is applied to operate the servo device is accordingly dependent upon the speed of the prime mover, which is determined by the downstream pressure of the pump 43, and by the pressure in the high pressure port 18, and also in accordance with the position of the throttle by means of the valve 45.

Having thus described my invention what I claim as new and desire to secure by Letters Patent is:

1. An hydraulic control system for a transmission system of the kind specified comprising a positive displacement type auxiliary pump arranged to be driven by a prime mover whereby the transmission system is driven, passage means affording communication between the downstream side of said auxiliary pump and the interior of said ported member, valve means affording communication between said passage means and whichever of two ports in the member is at a lower pressure, a relief valve whereby fluid from said lower pressure port can escape, further passage means in the ported member whereby fluid from the higher pressure port can reach the relief valve to tend to oppose the opening thereof under the influence of the pressure of fluid from the lower pressure port, the area of the relief valve on which the higher pressure acts being substantially smaller than that on which the lower pressure acts, the relief valve being arranged to regulate the pressure in the lower pressure port in accordance with the pressure existing in the higher pressure port, a piston and cylinder type servo device arranged to move the ported member to vary the piston strokes of the pump and motor respectively, and further valve means whereby, when the pressure at the delivery side of said auxiliary pump reaches a predetermined value, fluid at the pressure existing in said lower pressure port is permitted to enter one end of the cylinder of the servo device whilst fluid from the other end is permitted to escape.

2. An hydraulic control system as claimed in claim 1 in which a shuttle valve is disposed in the ported member, said shuttle valve being arranged to determine which of the two ports is at a higher pressure and permits flow to the relief valve from the lower pressure one of the ports, said flow through the relief valve being determined by the position of the relief valve in the ported member, in relation to a seating provided therein, said seating serving as a closure for the valve.

3. An hydraulic control system as claimed in claim 1 in which the ported member contains the valve means which comprises a shuttle valve, whereby the pressure in the lower pressure port is admitted to the passage means.

4. An hydraulic control system as claimed in claim 1 in which the piston of the servo device carries a rack engaging with teeth on the ported member, movement of the piston causing angular movement of the ported member.

5. An hydraulic control system as claimed in claim 1 in which the servo device has an angularly movable rod extending through the piston, the piston and rod having cooperating openings whereby the angular position of the rod in relation to the piston determines the permitted movement of the piston in its cylinder under the influence of hydraulic pressure.

6. An hydraulic control system as claimed in claim 5 in which the opening in the rod is a wide helical groove which can communicate with drillings in the bore of the piston in which the rod engages, angular movement of the rod determining the axial position of the piston at which such communication takes place.

7. An hydraulic control system as claimed in claim 1 in which there is a manually controllable valve arranged, in one position to permit fluid from the auxiliary pump to flow to one end of the cylinder of the servo device and also permits escape of fluid from the other end, and in another position allows flow to occur into said other end and out of said one end.

8. An hydraulic control system as claimed in claim 1 in which the passage means has a further valve for controlling flow of fluid therethrough, said further valve being positioned in accordance with the position of a throttle lever for controlling the speed of the prime mover whereby the transmission system is driven.

9. An hydraulic control system as claimed in claim 8 in which said further valve is connected to a mechanism which varies the rate of opening of said further valve in response to opening of said prime mover throttle lever in accordance with the position of the piston of the servo device in its cylinder.

10. An hydraulic control system as claimed in claim 8 in which the throttle lever is movable about a fulcrum member which is connected to a device which is responsive to the pressure of fluid in said passage means, to vary the position of said fulcrum member.

11. An hydraulic transmission system of the kind specified having a control system comprising a positive displacement type auxiliary pump arranged to be driven by a prime mover whereby the transmission system is driven, passage means affording communication between the downstream side of said auxiliary pump and the interior of said ported member, valve means affording communication between said passage means and whichever of two ports in the member is at a lower pressure, a relief valve whereby fluid from said lower pressure port can escape, further passage means in the ported member whereby fluid from the higher pressure port can reach the relief valve to tend to oppose the opening thereof under the influence of the pressure of fluid from the lower pressure port, the area of the relief valve on which the higher pressure acts being substantially smaller than that on which the lower pressure acts, the relief valve being arranged to regulate the pressure in the lower pressure port in accordance with the pressure existing in the higher pressure port, a piston and cylinder type servo device arranged to move the ported member to vary the piston strokes of the pump and motor respectively, and further valve means whereby, when the pressure at the delivery side of said auxiliary pump reaches a predetermined value, fluid at the pressure existing in said lower pressure port is permitted to enter one end of the cylinder of the servo device whilst fluid from the other end is permitted to escape.